United States Patent
Smith et al.

(10) Patent No.: US 6,503,964 B2
(45) Date of Patent: Jan. 7, 2003

(54) POLYMER COMPOSITION WITH METAL COATED CARBON FLAKES

(75) Inventors: Lyle James Smith, Providence, RI (US); Mikhail Sagal, Watertown, MA (US); James D. Miller, Marietta, GA (US); Kevin A. McCullough, Warwick, RI (US)

(73) Assignee: Cool Options, Inc., Warwick, RI (US)

(*) Notice: Subject to any disclaimer, the term of this patent is extended or adjusted under 35 U.S.C. 154(b) by 0 days.

(21) Appl. No.: 09/757,499

(22) Filed: Jan. 10, 2001

(65) Prior Publication Data

US 2001/0025075 A1 Sep. 27, 2001

Related U.S. Application Data

(60) Provisional application No. 60/175,435, filed on Jan. 11, 2000.

(51) Int. Cl.$^7$ .............................. G21K 1/12; C08K 9/02; B32B 15/04; B32B 15/20
(52) U.S. Cl. ....................... 523/137; 523/215; 524/495; 427/217; 428/403; 428/570
(58) Field of Search ................................. 523/215, 137; 524/495; 427/217; 428/403, 570

(56) References Cited

U.S. PATENT DOCUMENTS

| | | | | |
|---|---|---|---|---|
| 4,566,990 A | * | 1/1986 | Liu et al. |
| 4,596,670 A | * | 6/1986 | Liu |
| 4,678,699 A | * | 7/1987 | Kritchevsky et al. |
| 5,221,730 A | * | 6/1993 | Morris et al. |
| 5,366,664 A | * | 11/1994 | Varadan et al. |
| 5,827,997 A | * | 10/1998 | Chung et al. |
| 5,891,532 A | * | 4/1999 | Furuta et al. |

* cited by examiner

*Primary Examiner*—Tae H. Yoon
(74) *Attorney, Agent, or Firm*—Barlow, Josephs & Holmes, Ltd.

(57) ABSTRACT

A thermally conductive and electromagnetic interference and radio frequency reflective polymer composition and a method for creating the same is disclosed. Thermally conductive filler material is coated with a thermally conductive and electromagnetic interference and radio frequency reflective coating material and mixed with a base polymer matrix. The mixture is molded into the desired shape. The electromagnetic interference and radio frequency reflective coating material prevents the absorption and transfer of EMI and RF waves through the filler material thus resulting in an EMI and RF reflective composition.

6 Claims, No Drawings

POLYMER COMPOSITION WITH METAL COATED CARBON FLAKES

This application claims the benefit of Provisional Application No. 60/175,435 filed on Jan. 11, 2000.

BACKGROUND OF THE INVENTION

The present invention relates generally to an improved method of manufacturing a composite material. More specifically, the present invention relates to a method of manufacturing a molded material, formed from a base matrix loaded with filler material, that results in a completed composition that has high thermally conductivity and reflects electromagnetic interference (EMI). In addition, the present invention relates to passively conducting heat away from heat generating objects by use of thermally conductive composite materials while further shielding the device from EMI.

In industry, there are various parts and components that generate heat during operation. For example, in the electronics and communications industries, it is well known that integrated circuit components generate heat during operation. Various types of electronic device packages containing integrated circuit chips, such as satellite dishes, are such devices that generate heat. Often these devices contain integrated circuit systems with a tightly packed configuration that requires all of the components to be installed in close proximity to one another. These integrated circuit devices, particularly the main processor chips, generate a great deal of heat during operation which must be removed to prevent adverse effects on operation of the system into which the device is installed. For example, the operational section of a satellite dish, containing many integrated circuit components, is highly susceptible to overheating which could destroy the device itself or cause the components within the device to malfunction.

There are a number of prior art methods to cool heat generating components and objects to avoid device failure and overheating, as discussed above. Since the space available within these devices is generally quite limited the heat must be conducted away from the heat-generating component for dissipation at the periphery of the device. In these cases, a heat-conducting device is commonly placed into communication with the heat generating surface at one end and a heat sink at the other to dissipate the heat therefrom. For example, heat pipes which are typically constructed from a metal casing that is charged with a conductive gas and serves primarily as a conductor with little heat-dissipating characteristic, are frequently used. However, they typically require the inclusion of a heat sink device in the cooling system. A heat sink typically includes a base member with a number of individual cooling members, such as fins, posts or pins, to assist in the dissipation of heat and may be incorporated into the case of the heat generating device. The geometry of the cooling members is designed to improve the amount of surface area of the heat sink that contacts the ambient air for optimal heat dissipation. The use of such fins, posts or other surface area increasing methods, in an optimal geometrical configuration greatly enhances heat dissipation compared to devices with no such additional cooling members, such as a flat heat spreader, such a heat sink may be used individually without the further assistance of a heat pipe.

To further enhance airflow and resultant heat dissipation, fans and devices have been used, either internally or externally. However, these external devices consume power and have numerous moving parts. As a result, heat sink assemblies with active devices are subject to failure and are much less reliable than a device that is solely passive in nature.

It has been discovered that more efficient cooling of electronics can be obtained through the use of passive devices that require no external power source and contain no moving parts. It is very common in the electronics industry to have many electronic devices grouped on a single circuit board, such as a motherboard, modem, or "processor card" such as the Celeron board manufactured by Intel Corporation. For example, video cards, which are capable of processing millions of polygons per second, are also susceptible to overheating and need efficient and effective cooling, as do the CPUs discussed above. Video cards typically have at least one chip thereon that runs extremely hot to necessitate a cooling system designed to operate within small clearances.

In the heat transfer industries, it has been well known to employ metallic materials for thermal conductivity applications, such as heat dissipation for cooling integrated circuit device packages. For these applications, such as device casings operating as heat sinks, the metallic material typically is tooled or machined from bulk metals into the desired configuration. However, such metallic conductive articles are typically very heavy, costly to machine and are susceptible to corrosion. Further, the use of metallic materials commonly creates electromagnetic interference (EMI), which often detracts from the performance of the device on which the heat sink is affixed. Finally, the geometries of machined metallic heat dissipating articles are very limited to the inherent limitations associated with the machining or tooling process. As a result, the requirement of use of metallic materials which are machined into the desired form, place severe limitations on heat sink and heat conductor design particular when it is known that certain geometries, simply by virtue of their design, would realize better efficiency but are not attainable due to the limitations in machining metallic articles. To compensate for these limitations, active cooling, such as by powered fans, must be employed to achieve the requisite cooling to prevent device failure.

It is widely known in the prior art that improving the overall geometry of a heat-dissipating article can greatly enhance the overall performance of the article even if the material employed is the same. Therefore, the need for improved heat sink geometries necessitated an alternative to the machining of bulk metallic materials. To meet this need, attempts have been made in the prior art to provide molded compositions that include conductive filler material therein to provide the necessary thermal conductivity. There compositions may include a polymer base matrixwith a conductive filler loaded therein. The ability to mold a conductive composite enabled the design of more complex part geometries to realize improved performance of the part.

However, a drawback in the thermally conductive molded polymer compositions, loaded with metallic reinforcing materials such as copper flakes, is that they inherently absorb EMI and radio frequency waves. As a result of their absorptive characteristics, these materials effectively operate as antennas, absorbing EMI that could potentially interfere with the operation of the device into which they have been incorporated. Further, attempting to insulate the composition to prevent EMI absorption would also interrupt the thermally conductive pathways and defeat the ability of the composition to transfer heat. As a result, the use of these conductive polymers in devices such as satellite components and receiver equipment is undesirable.

In view of the foregoing, there is a demand for a composite material that is highly thermally conductive and EMI reflective. There is a demand for a passive heat dissipation assembly with no moving parts that can provide heat dissipation without the use of active components. In addition, there is a demand for a composite material that can be molded or cast into complex product geometries. There is also a demand for such a moldable article that exhibits thermal conductivity as close as possible to purely metallic conductive materials while being an effective insulator against EMI absorption.

SUMMARY OF THE INVENTION

The present invention preserves the advantages of prior art thermally conductive plastic compositions namely net-shape moldability and thermal conductivity. In addition, it provides new advantages of EMI reflective properties not found in currently available compositions and overcomes many disadvantages of such currently available compositions.

The invention is generally directed to the novel and unique thermally conductive plastic composite material with EMI reflective properties having particular application in heat dissipation applications where heat must be moved from one region to another to avoid device failure. The composite material of the present invention enables a highly thermally conductive composite material to be manufactured at relatively low cost. The conductive molding composition of the present invention preserves a thermal conductivity above 22 W/m° K. as taught in the prior art while also providing insulation against electrical conductivity. The thermally conductive composition includes a polymer base matrix of, by volume, between 30 and 60 percent and thermally conductive filler materials, by volume, between 35 and 70 percent.

Prior to mixing the filler material into the polymer base matrix in preparation for injection molding, the filler material is coated with another material that is both thermally conductive and EMI reflective. The coating material, while highly thermally conductive does not allow the filler material to absorb EMI waves. As a result, the coating material effectively insulates the filler material and prevents it from absorbing EMI waves and transferring them throughout the composition while allowing still allowing heat to be transferred through its surface and into the filler. After the coating process, the coated filler is incorporated into the polymer base matrix material and injection molded. Therefore, the present invention preserves the benefits of the thermal conductivity in the prior art, while overcoming the shortfall by insulating against EMI absorption.

It can be appreciated that the present application has a broad range of applications in areas where use of lightweight material is indicated that can transfer the heat out of an object while reflecting EMI and RF waves. This is particularly important in a satellite dish environment, which is very EMI sensitive. Since the moldable conductive polymer inherently absorbs EMI and RF waves, there is a danger that this interference will be conducted back into the circuitry from which the heat is being dissipated. This interference is often problematic and prevents the device from functioning properly. To prevent the parts from absorbing EMI and RF, the thermally conductive filler material of the present invention is covered with a metallic coating to effectively reflect the EMI and RF waves and avoid the unwanted interference often encountered in telecommunications applications.

It is therefore an object of the present invention to provide a conductive composite material that has a greater thermal conductivity and higher EMI and RF reflectivity than found in prior art composites.

It is an object of the present invention to provide a thermally conductive composite material that does not absorb EMI and RF yet is net-shape moldable.

It is a further object of the present invention to provide a low cost thermally conductive and EMI and RF reflective composite material.

Another object of the present invention is to provide a thermally conductive composite material that does not absorb EMI or RF and enables the molding of complex part geometries.

It is a further object of the present invention to provide a thermally conductive composite material that does not absorb EMI or RF and is significantly lighter in weight than metallic materials.

It is yet a further object of the present invention to provide a conductive composite material that has a thermal conductivity close to pure metallic materials and reflects EMI and RF waves.

DETAILED DESCRIPTION OF THE PREFERRED EMBODIMENT

The present invention is composition and a method by which a composition, formed by combining a polymer base matrix, a thermally and EMI and RF wave absorptive filler, and a thermally conductive and EMI and RF wave reflective coating material is molded into a finished component that has thermally conductive and EMI and RF wave reflective properties.

The composition of the present invention employs a base matrix of polymer, for example, with different types of filler material loaded therein. The base matrix is, preferably, liquid crystal polymer; however, it may be other materials. This composition is achieved through the steps of combining the base matrix material with a thermally conductive filler material and molding the composition. This process is known to result in producing polymer compositions with high thermal conductivities as compared to the base matrix alone.

The base matrix is loaded with thermally conductive filler. The mix may include, for example, by volume, 40 percent base matrix and 60 percent filler material. Depending on the base matrix and filler, loading can be even higher.

One of the primary reasons for employing a thermally conductive plastic composition is that it is moldable into more complex geometries to achieve better heat dissipation. Because of the versatility of the material, applications that would clearly indicate its use are extremely widespread. Many of these applications, however, require both heat dissipating and electrical insulation to be provided concurrently. By way of example, a satellite receiver dish employs a small densely packed circuit package to receive transmissions. The circuits generate a great deal of heat and are continually bombarded with EMI and RF waves. To protect the surrounding device components and satellite dish circuitry from heat buildup and malfunctions resulting from EMI and RF absorption, the circuitry of the satellite dish must be enclosed in an EMI and RF wave reflective case that can also effectively dissipate heat. Traditionally, these cases would be constructed from a metallic material with reflective properties that prevent EMI and RF and also transfer heat. The traditional casings, however, have the traditional drawbacks associated with the fabrication of metal casings as discussed earlier.

In these applications, it is logical to attempt to employ thermally conductive polymers as a heat transfer solution. The drawback in the prior art is that although the polymers conduct heat, they also absorb and transfer EMI and RF waves over the same pathways used to transfer the heat. The present invention overcomes the absorption problem of the prior art allowing application of thermally conductive polymers in environments that also require EMI and RF wave shielding.

The present invention provides a thermally conductive composite material that is formed by first coating the thermally conductive filler material that is to be employed. The coating of the thermally conductive filler material provides a barrier against the natural properties of the filler to absorb EMI and RF waves while conducting heat to the filler, allowing the heat transfer process to continue. The preferred embodiment of the present invention employs carbon flakes as a thermally conductive filler material. The carbon flakes are then coated with a thermally conductive yet EMI and RF wave reflective material, in the preferred embodiment. This coating is preferably copper but may be other metallic materials, such as aluminum or nickel. The coating provides EMI and RF wave shielding to the naturally conductive filler material preventing transfer of into the filler core and thus preventing EMI and RF waves transfer throughout the final composition.

Once coated, the filler material is introduced to the base polymer matrix. The two components are mixed and loaded into the desired molding machine and associated mold in a fashion known in the art which need not be discussed in detail here. Once removed from the mold, the final composition is in its final shape and ready for its end use.

As can be understood, the process does not eliminate the localized, introduction of EMI and RF waves into the composition or slight conductivity in localized areas within the material. The composition formed in the process of the present invention, however, prevents conduction and absorption of EMI and RF waves throughout the entire composition by interrupting the pathways within the composition over which the interference would flow.

The process of the present invention can be employed for many of the various configurations used in fabricating a thermally conductive composite. Although the preferred embodiment indicates the use of carbon flake filler in a polymer base matrix, many other fillers can be employed to achieve the desired thermally conductive composition. As the type of filler varies, the method of coating the particular material remains the same and EMI reflective metallic material is employed as the coating.

In view of the foregoing, a superior moldable thermally conductive composite material with EMI and RF wave reflective properties can be realized. The composition of the present invention, greatly improves over prior art attempts to provide such EMI and RF wave reflective, moldable, thermally conductive materials. In particular, the present invention provides thermal conductivity that is vastly improved over known compositions and provides insulation against the absorption EMI and RF waves that was until now unavailable in the prior art.

It would be appreciated by those skilled in the art that various changes and modifications can be made to the illustrated embodiments without departing from the spirit of the present invention. All such modifications and changes are intended to be covered by the appended claims.

What is claimed is:

1. A method of molding a composition, comprising the steps of:

providing a base polymer matrix material;

providing a thermally conductive and electromagnetic interference and radio frequency absorptive carbon flake filler material;

coating said filler material with a coating material;

mixing said filler material with said base matrix into a mixture; and molding said mixture into a net-shape molded article.

2. The method of claim 1, wherein said step of providing a base matrix material is providing a liquid crystal polymer.

3. The method of claim 1, wherein said step of coating is coating with a thermally conductive and electromagnetic interference and radio frequency reflective material selected from the group consisting of: aluminum, copper and nickel.

4. A method of molding a thermally conductive electrically insulative composition, comprising the steps of:

providing a base polymer matrix material;

providing a thermally conductive carbon flake filler material;

coating said filler material with an electromagnetic interference and radio frequency reflective material, producing a coated filler material;

mixing said filler material with said base matrix into a mixture; and net shape molding said mixture of said coated filler material and said base matrix.

5. The method of claim 4, wherein said step of providing a base matrix material is providing a liquid crystal polymer.

6. The method of claim 4, wherein said step of coating is coating with a material selected from the group consisting of: aluminum, copper and nickel.

* * * * *